(12) United States Patent
Ritter (10) Patent No.: US 7,689,904 B2
(45) Date of Patent: Mar. 30, 2010

(54) TEMPLATE-BASED CREATION OF ELECTRONIC DOCUMENT

(75) Inventor: Gerd M. Ritter, Heidelberg (DE)

(73) Assignee: SAP AG, Walldorf (DE)

( * ) Notice: Subject to any disclaimer, the term of this patent is extended or adjusted under 35 U.S.C. 154(b) by 1012 days.

(21) Appl. No.: 11/368,841

(22) Filed: Mar. 6, 2006

(65) Prior Publication Data

US 2007/0208993 A1   Sep. 6, 2007

(51) Int. Cl.
*G06F 3/00* (2006.01)
(52) U.S. Cl. .................. 715/234; 715/700; 715/746; 715/764; 715/811; 715/816
(58) Field of Classification Search .............. 715/505, 715/234, 746, 700, 764, 811, 816
See application file for complete search history.

(56) References Cited

U.S. PATENT DOCUMENTS

| | | | | |
|---|---|---|---|---|
| 6,668,354 | B1 * | 12/2003 | Chen et al. | 715/255 |
| 7,287,229 | B2 * | 10/2007 | Forkner et al. | 715/762 |
| 7,505,985 | B2 * | 3/2009 | Kilroy | 707/101 |
| 2003/0144948 | A1 * | 7/2003 | Cleary et al. | 705/38 |
| 2004/0064783 | A1 * | 4/2004 | Braun et al. | 715/500 |
| 2007/0180377 | A1 * | 8/2007 | Gittelman et al. | 715/703 |

OTHER PUBLICATIONS

Cooper, Alan, "Entry and Display Gizmos," *About Face: The Essentials of User Interface Design*, Hungry Minds, Inc., New York, pp. 393-420 (1995).

Crupi, Kristen, "Working with E-mail," *Step by Step: Microsoft Outlook Version 2002*, Microsoft Press, Redmond, pp. 10-13 (2001).

Microsoft Corporation, "Menus, Controls, and Toolbars," *The Windows Interface Guidelines for Software Design*, Microsoft Press, Redmond, pp. 157-163 (1995).

"MS-DOS 6 Commands: Fasthelp—Format" [online]. [retrieved on Mar. 6, 2006]. Retrieved from the Internet: <URL:http://www.microsoft.com/technet/archive/msdos/comm4.mspx>.

"Travelosity: Great Prices on Airfare, Airline Tickets, Hotels, Cars and Car Rentals, Vacation and Resort Packages, and Cruises." 1996, [retrieved on Mar. 6, 2006]. Retrieved from the Internet: <URL: http://web.archive.org/web/20041130092000/http://www.travelocity.com>.

* cited by examiner

*Primary Examiner*—Joshua D Campbell
*Assistant Examiner*—Christopher Bryant
(74) *Attorney, Agent, or Firm*—Mintz, Levin, Cohn, Ferris, Glovsky and Popeo, P.C.

(57) ABSTRACT

Operations included in creation of an electronic document having a plurality of predefined fields include receiving an input that a user makes under guidance of an input area in a graphical user interface (GUI). The input includes a character string and is made to create an electronic document in a computer system. A field with which the first character string is associated is determined. A template has a template input area for each of several predefined fields. The template is displayed in the GUI with an entry corresponding to the string entered in the correct input area. A GUI includes the input area and a template display area. Upon determining that the first character string is associated with a first predefined field, the first character string is entered in the template input area for the first predefined field. The string can also be used for template selection.

20 Claims, 7 Drawing Sheets

TEMPLATE-BASED CREATION OF ELECTRONIC DOCUMENT

TECHNICAL FIELD

The description relates to creating an electronic document using a template.

BACKGROUND

Many computer systems provide that users can generate electronic documents. The following are examples of such situations: a call center agent interacts with customers and generates standard sales orders, service orders, complaints, etc., based on those interactions; a back office agent or secretary fills out forms for a department; and a person fills out an electronic form on a web site. If the user is new or relatively inexperienced at filling out the form, typically the user interface provides guidance as to what information should be entered and where, for example through field explanations or help functions.

However, a user who has used the template (or a similar one) many times becomes familiar with its contents and structure. The user may know, even before launching the template, what fields are to be completed and in which order they come. These "advanced" users may find it cumbersome to enter the necessary information using the template structure that the user interface provides.

Moreover, the user interface may require the user to perform repetitive tasks to fill in the information. For example, the fields for entering the essential information may be spread among many fields on a complex screen. The user then has to move between the fields, for example by repeatedly pressing the tab key or by moving one hand from the keyboard to the mouse. Unless the user is willing to move back and forth between the fields, the information must be entered in the order defined by the user interface. The disadvantage in these situations is that the knowledgeable user may feel the user interface is slow or poorly configured because it does not let the user enter the essential information very quickly although the user already knows exactly what information is needed.

In some situations the user can work with several templates to perform various tasks in the system. The templates may be for closely related documents such as a sales order and a sales order quote, or templates for essentially unrelated documents such as an email and a calendar appointment. The user must always first open the correct template, and this is done in different ways depending on which template it is and the application program that generates it. For example, to generate a new email the user would perform steps that are significantly different from launching a new leave request or creating a sales order. The user may find it frustrating that there are such different ways of initiating templates for the common purpose of entering information for creating an electronic document.

SUMMARY

The invention relates to template-based document creation.

In a first general aspect, a computer program product tangibly embodied in an information carrier includes instructions that, when executed, cause a processor to perform operations included in creation of an electronic document having a plurality of predefined fields. The operations include receiving an input that a user makes under guidance of an input area in a graphical user interface (GUI). The input is made to create an electronic document in a computer system, and the input includes at least a first character string. The operations include determining, among several predefined fields, a first predefined field with which the first character string is associated. A first predefined template in the computer system includes a template input area for each of the several predefined fields. The operations include displaying the first predefined template in the GUI with an entry corresponding to the first character string being entered in the template input area for the first predefined field.

Implementations may include any or all of the following features. The operations may further include receiving at least one other input made under guidance of the first predefined template. The input area may be associated with several predefined templates for initiating creation of electronic documents using any of the predefined templates. The input may further include a second character string that is used to identify the first predefined template among the several predefined templates. Some of the several predefined templates may be associated with different application programs. The input area may be associated with the first predefined template for initiating creation of electronic documents using only the first predefined template. The entry may be selected from the group consisting of: a name, an address, a location, a time, a date, an amount, a topic, and combinations thereof. The first character string may be a truncated version of the entry or a code for the entry, and the computer system may determine the entry using the first character string. The electronic document may be selected from the group consisting of a business transaction document, a sales order, a service order, a quote, an invoice, a request, an inquiry, a memorandum, a note documenting a phone conversation, a calendar entry, a meeting request, an email, and combinations thereof. The first predefined template may be accessed at a predefined site of a public computer network.

In a second general aspect, a computer program product tangibly embodied in an information carrier includes instructions that, when executed, cause a processor to perform operations included in creation of an electronic document having a plurality of predefined fields. The operations include receiving a textual information input that a user makes under guidance of an input area in a graphical user interface (GUI) of a display device and as part of a process of creating an electronic document having predefined fields. The input area in the GUI is not associated with only one of the predefined fields. The operations include determining whether the textual information input includes value information for any of the predefined fields. If so, the operations include 1) identifying the value information in association with the predefined field for the value information; and 2) displaying in the GUI a predefined document creation template that has a template input area for each of the predefined fields, and including the identified value information within the template input area for the predefined field associated with the identified value information.

Implementations may include any or all of the following features. The operations may further include receiving at least one other input made under guidance of the predefined document creation template. The input area may be associated with several predefined document creation templates for initiating creation of electronic documents using any of the predefined document creation templates. The textual information input may further include a character string that is used to identify the predefined document creation template among the several predefined document creation templates. Some of the several predefined document creation templates may be associated with different application programs. The input area may be associated with the predefined document creation template for initiating creation of electronic documents using only the predefined document creation template.

In a third general aspect, a computer program product tangibly embodied in an information carrier includes instructions that, when executed, generate on a display device a graphical user interface for creating an electronic document having a plurality of predefined fields. The graphical user interface includes an input area for guiding a user in making an input to create an electronic document using a predefined template that is not currently displayed. The input includes at least a first character string. The graphical user interface includes a template display area for displaying at least the predefined template. The predefined template has a template input area for each of several predefined fields. The GUI is configured to display the predefined template in the template display area upon a determination that the first character string is associated with a first predefined field of the several predefined fields, and the first character string is entered in the template input area for the first predefined field.

Implementations may include any or all of the following features. The input area may be associated with several predefined templates for initiating creation of electronic documents using any of the predefined templates. Some of the several predefined templates may be associated with different application programs. The input area may be associated with the predefined template for initiating creation of electronic documents using only the predefined template.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numerals in the various drawings indicate like elements.

DETAILED DESCRIPTION

Figure 1A:
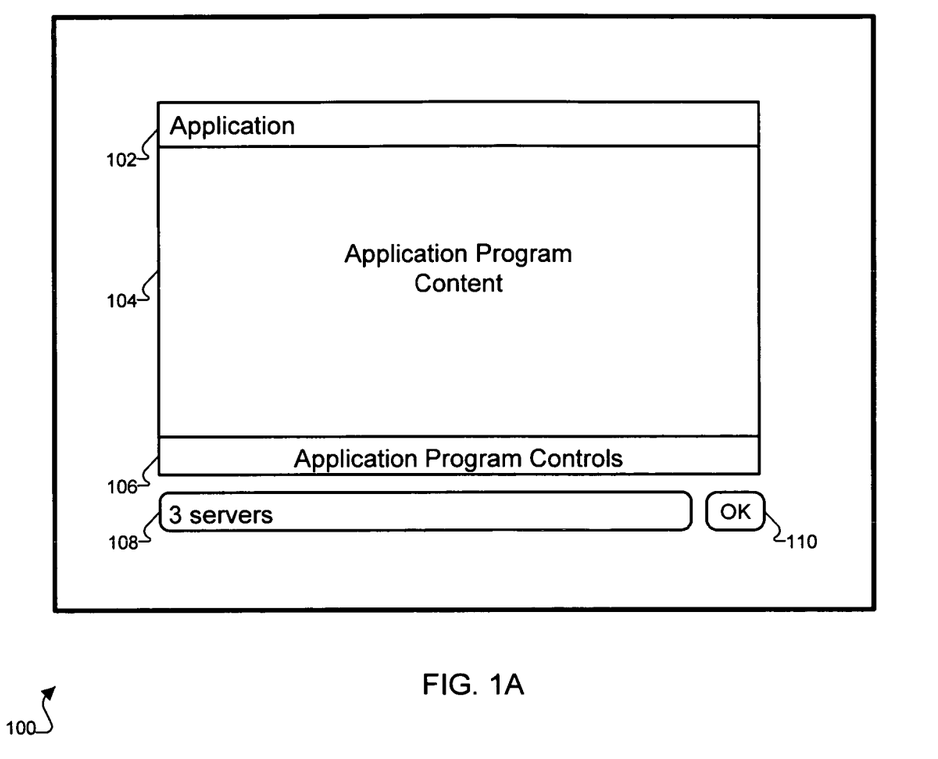
FIG. 1A shows an example of a graphical user interface (GUI) with an input area for initiating creation of an electronic document.

FIG. 1A shows a graphical user interface (GUI) 100 being generated in a computer system. The GUI 100 can receive user-entered text in an input area to initiate creation of an electronic document using a predefined template. Upon receiving one or more character strings in the input area, the system can initiate display of the predefined template in the GUI, wherein an entry corresponding to the character string is made in an appropriate input field of the template. The system can select the template from several templates using a portion of the user's input.

In the exemplary GUI 100 of FIG. 1A, a user is working with an application 102 and in doing so interacts with the application program content 104. For example, the user works in a sales organization and is currently entering and manipulating data in a spreadsheet application. The user may be editing the program content 104 using application program controls 106 such as saving changes to the program content 104. In this example, an incoming phone call is received while the user is working with the application 102. The incoming call is a customer looking for a sales quote for three servers.

The user recognizes that sales quotes cannot be created in the current application 102, so to create the sales quote the user would launch another application in the computer system that can accept the sales quote information. The GUI 100 contains an input area 108 and an "OK" button 110 for automatically initiating the other application to present the sales quote template and for pre-filling the template with information that the user enters.

Here, the user enters the text "3 servers" into the input area 108 because the customer on the phone requests a sales quote for three servers. The user knows what fields are included in the sales company document templates and expects the integer "3" to be understood by the system as a quantity. Moreover, the user expects the term "servers" to be understood as a product. Upon entering this information into the GUI 100, the user clicks the "OK" button 110 or hits the Return key on the keyboard.

Figure 1B:
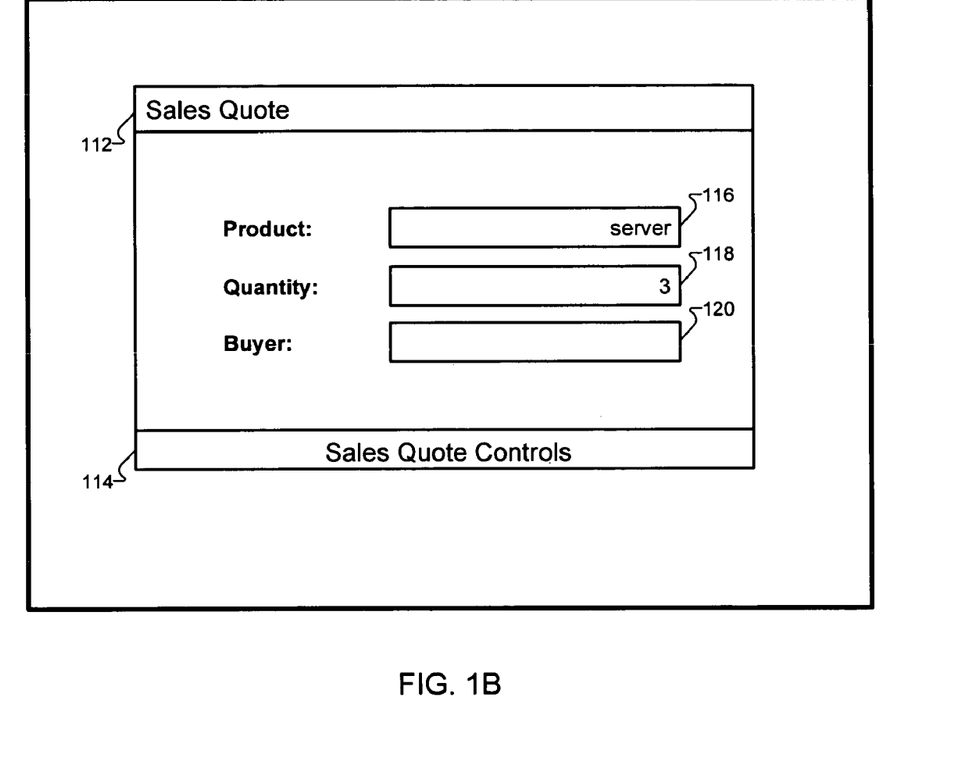
FIG. 1B shows an example of a predefined template being presented upon receipt of an entry in the input area of the GUI in FIG. 1A.

Input that the user makes in the GUI input area in FIG. 1A may be parsed and all or some portion thereof can be used to automatically make an entry in the predefined template. FIG. 1B shows an electronic document template presented upon receipt of the user input of FIG. 1A. The document template is a sales quote template 112 having sales quote controls 114 for performing operations such as save or delete on the template. In this example, predefined fields include a product 116, a quantity 118 and a buyer 120. Here, the product field 116 has been pre-filled with an entry corresponding to the user-entered text "server." Similarly, the quantity field 118 has been pre-filled with the number of customer requested servers. The predefined field for the buyer 120 has been left blank because the user did not specify information for this field. The user may alter or add data in predefined fields in the sales quote template 112. The example in FIG. 1B shows only a few predefined fields for simplicity. In other implementations, the sales order quote may contain many predefined fields, and different groups of the fields may be pre-filled using the user input.

In this example, the template is displayed in the GUI before the electronic document has been persisted in the system. The electronic document can be created, based on the information entered in the template, using the sales controls 114. Thus, when the user is done filling in the template, the user can initiate creation of the electronic document that represents the sales quote.

In some implementations, pre-filled data may activate an automatic filling of other fields within an electronic document. For example, suppose all sales quotes for computer products, such as servers, are directed to one buyer. The buyer's name may be automatically entered into the predetermined field 122 for the assigned buyer. Alternately, the user may change the pre-filled values or add additional information to predetermined fields within an electronic document after creation. Other fields may be automatically filled based on this entry. For example, the bill-to party or the payer can be determined from the buyer's name.

Figure 2A:
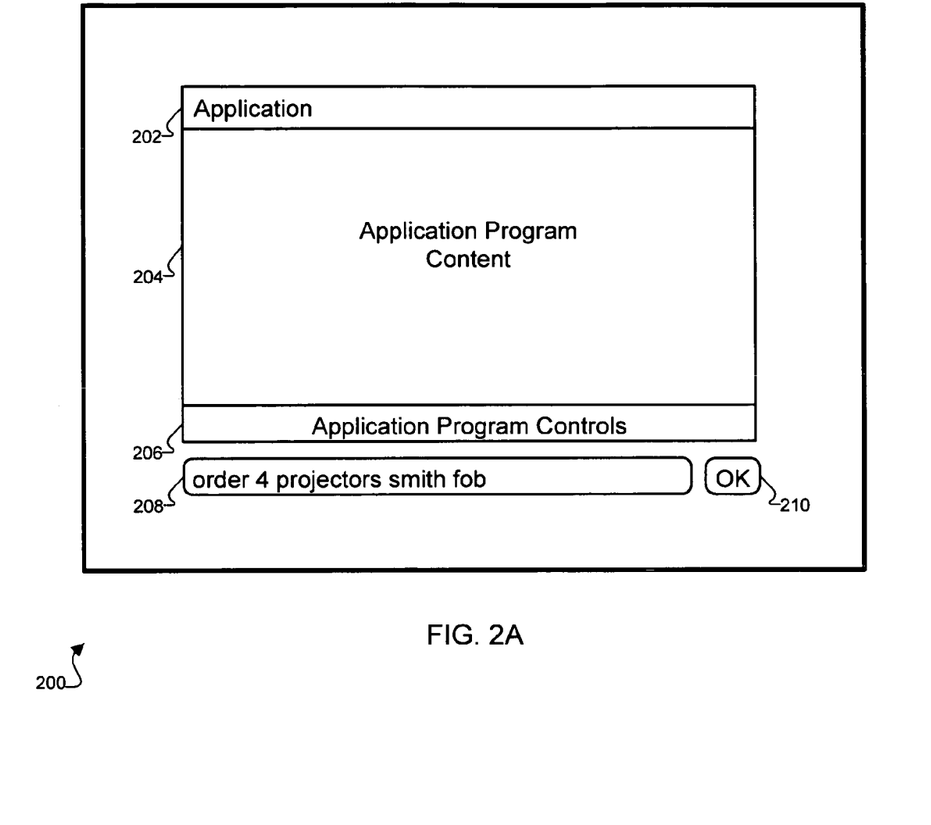
FIG. 2A shows another example of a GUI with an input area for initiating creation of an electronic document.

FIG. 2A shows a graphical user interface (GUI) 200 that can receive user-entered text in an input area to initiate creation of an electronic document using a predefined template. In the exemplary GUI 200, an employee of a sales organization is working with an application 202 and in doing so interacts with the application program content 204. For example, the user is currently entering and manipulating data in an inventory management application. The user may be editing the program content 204 using application program controls 206. In this example, an incoming order request is received via email while the user is working with the application 202. The incoming email is from a buyer named "Smith" who is placing a sales order for four projectors. The sales order cannot be created in the current application 202, so to create the sales order the user would launch another application in the computer system that can accept the sales order information. The GUI 200 contains an input area 208 and an "OK" button 210 for automatically presenting a pre-filled template. The input area 208 is associated with several templates, one of which will be selected based on at least a portion of the user's entry in the area.

The user enters the text "order 4 projectors smith fob" into the input area 208. The user's entry may be parsed, similar to a search query entered in an online search engine, to determine the meaning of the information input. Particularly, the user expects the first term "order" to trigger the system to use a sales order template, as opposed to any of the other templates that can be initiated using the input area 208. Similarly, the term "projectors" may correspond to a product field and the term "smith" may be interpreted as a buyer's name in the system. The term "4" placed next to the term "projectors" may be interpreted as the quantity of that product. Additionally, fields that relate to the shipping procedures in the sales order may be pre-filled. For example, the term "fob" entered into the input area 208 may be interpreted as "free on board" indicating that the supplier will pay the cost of shipping the sales order. Upon entering the sales order information into the GUI 200, the user clicks the "OK" button 210 or hits the Return key.

Figure 2B:
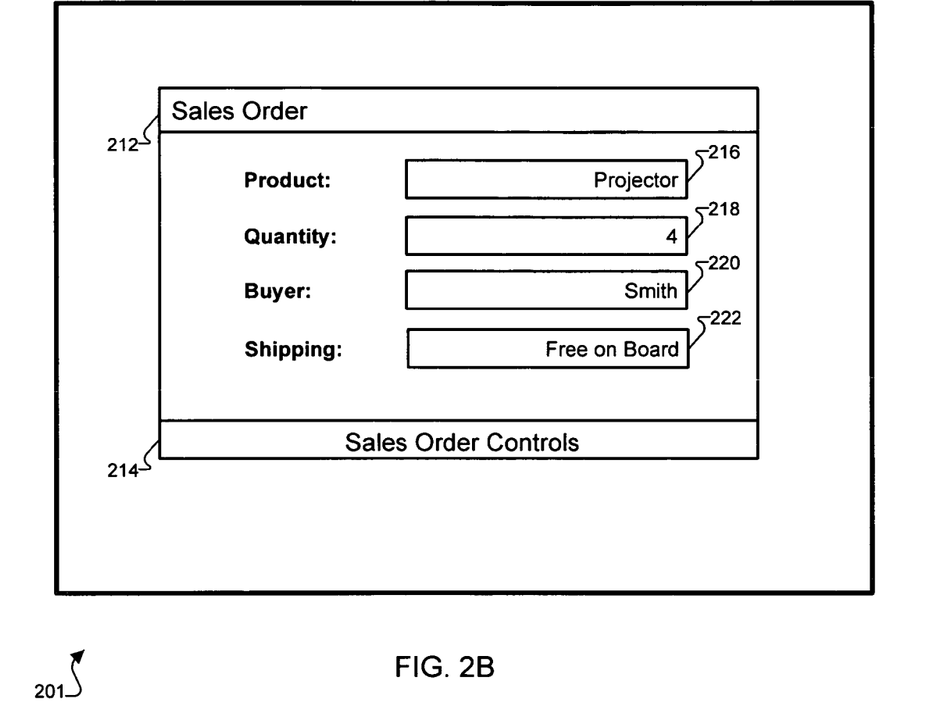
FIG. 2B shows an example of a predefined template being presented upon receipt of an entry in the input area of the GUI in FIG. 2A.

FIG. 2B shows an electronic document template presented upon receipt of the user input in FIG. 2A. The template is generated using a sales order application 212. Here, predefined fields in the sales order application include a product field 216, a quantity field 218, a buyer field 220 and a shipping field 222. The sales order application 212 contains sales order controls 214 for performing operations such as creating or deleting sales orders in the template. The fields have been prefilled using the information that the user entered in the GUI area 208.

Particularly, the product field 216 has been pre-filled using the user-entered text "projectors." Similarly, the quantity field 218 has been pre-filled with the number of requested projectors. The predefined field for the buyer 220 has been pre-filled with the name "Smith." Here, the user-entered term "fob" was used in making the "free on board" entry in the sales order document 212. Other field contents such as the responsible party may be determined from the buyer's name and automatically prefilled. The user may alter or add data in predefined fields in the sales order document 212. When the user is done filling in the template, the user can initiate creation of the electronic document that represents the sales order using the sales order controls 214, for example by saving the document. The example in FIG. 2B shows only a few predefined fields for simplicity. In other implementations, the sales order document may contain many predefined fields, and different groups of the fields may be pre-filled using the user input.

The entries that are automatically made in the template correspond to one or more strings in the user input. The user input may contain an entire string to be entered into the predefined template or contain only a truncated portion of the string. For example, the user could have entered "smi" instead of "smith" because the system understands "smi" to be a truncated portion of "Smith." More information may be added based on the user-entered string. For example, if the user enters a word that unambiguously refers to a specific product, the product number for that product can be entered in the product field. The user may also input a code for a specific entry to indicate to whom a sales order belongs. For example, "fob" is a code for the entry "free on board." The computer system can determine which of several predefined templates to display using the first character string entered by the user, such as "order" in the above example.

Many different types of entries can be made in the input area for causing a pre-filled template to be displayed. For example, the entry can include one or more of a name, an address, a location, a time, a date, an amount, a topic, or combinations thereof. Entries from these and other categories can be parsed to determine the field to which they relate.

Many different types of templates may be displayed upon receiving user input in the GUI. For example, the template can include one or more of a business transaction document, a sales order, a service order, a quote, an invoice, a request, an inquiry, a memorandum, a note documenting a phone conversation, a calendar entry, a meeting request, an email or combinations thereof. A predefined template may be accessed at a predefined site of a public computer network such as at a particular internet address.

Figure 3:
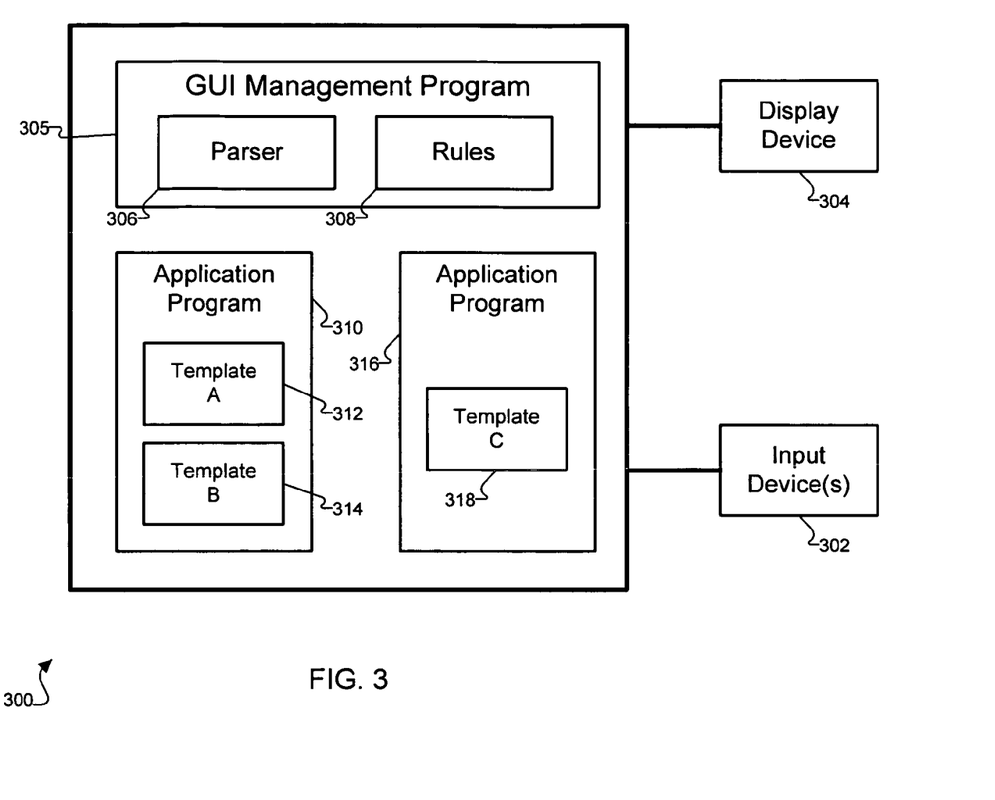
FIG. 3 is a block diagram of a system for initiating creation of an electronic document.

FIG. 3 shows a block diagram of an exemplary system 300 that can initiate creation of an electronic document. The system contains one or more input devices 302, a display device 304 and a graphical user interface (GUI) management program 305. The GUI management program 305 presents pre-filled templates to a user on the display device 304. Such a template may be triggered by, and contain entries based on information included in, an input that the user makes with the input device(s) 302. The input devices may include a keyboard or a pointing device.

The GUI management program 305 contains a parser 306 for parsing user-entered data to determine the value field with which the user-entered data is associated. For example, the parser 306 can determine that "projectors" relates to a product field and that "fob" is a code that relates to a shipping field.

Figure 4:
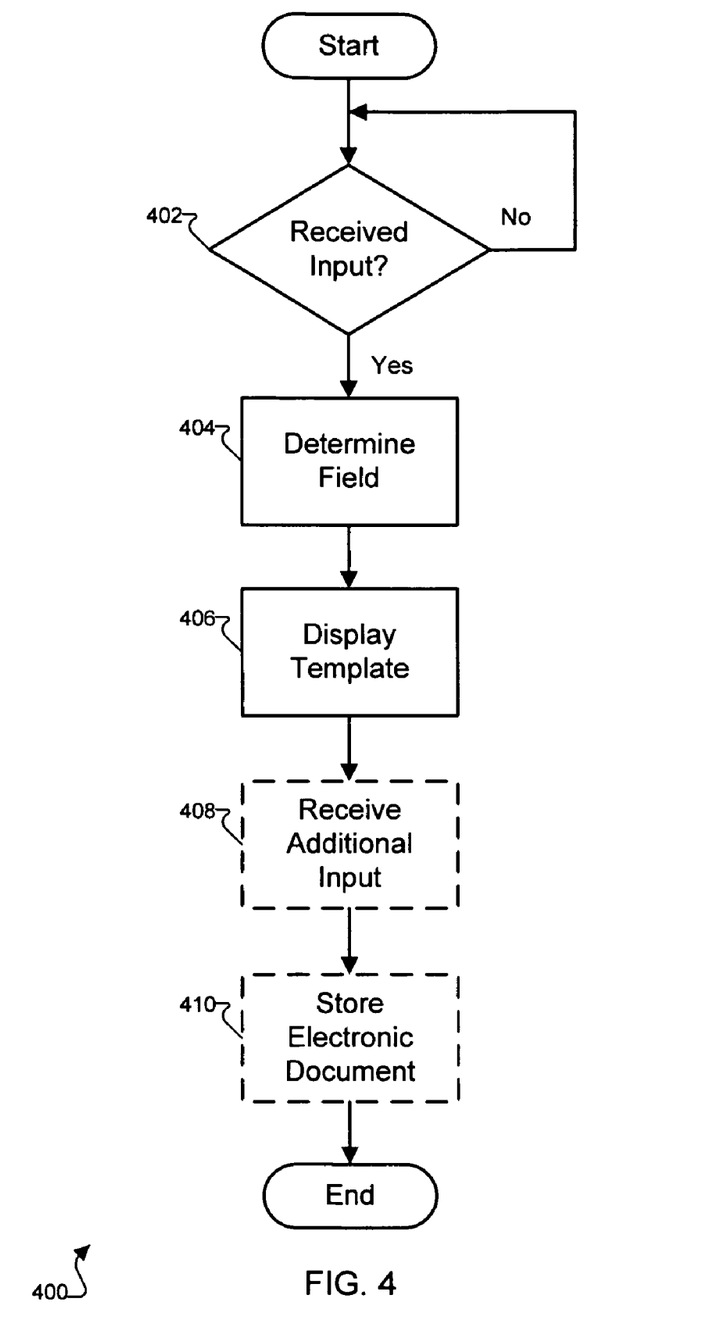
FIG. 4 is a flow chart of exemplary operations that a system may perform in initiating creation of an electronic document.

The GUI management program includes rules 308. The rules 308 may be associated with a particular type of template or may be common to all templates. Using the rules 308, multiple templates associated with different application programs can be accessed. For example, an application program 310 may be configured to use both Template A 312 and Template B 314, and another application program 316 may be configured to use a Template C 318. The GUI management program may then select, based in the user input, one of the templates A-C to display and pre-fill with the user entered data. The rules 308 may determine which template to display as well as determine with which field of the template the received character string is associated. If there are several available templates, the rules 308 may state how to select between them. For example, the character string that a user enters as input may be parsed to determine which template to display and the parser can use the rules in this regard. FIG. 4 is a flow chart of exemplary operations 400 that can be performed to provide a pre-filled template to a user. The operations 400 can be performed by a processor executing instructions stored in a computer program product. The operations 400 begin in step 402 with receiving an input that a user makes under guidance of an input area in a GUI. The input area is associated with at least one predefined template for creating an electronic document. For example, input can be received in the area 108 or in the area 208. If input is not received in step 402, then the operations 400 returns to await input from a user.

If input is received in step 402, then the operations 400 determine, among several predefined fields, a first field with which the user input is associated, in step 404. A first predefined template in the system includes a template input area for each of the several predefined fields. For example, in the FIG. 1B sales quote application, it is determined that the "3" relates to a quantity field and that the entry "servers" belongs in the product field.

Upon determining the appropriate field(s) for user entered data, the operations 400 displays the predefined template to the user in step 406. The predefined template is displayed with an entry corresponding to the user input in the template input area for the corresponding field. For example, the sales order template was displayed in FIG. 2B.

Further operations may be carried out as necessary. The user may enter additional data into the document template and the operations 400 can receive the input in optional step 408. The electronic document may be stored in optional step 410.

Figure 5:
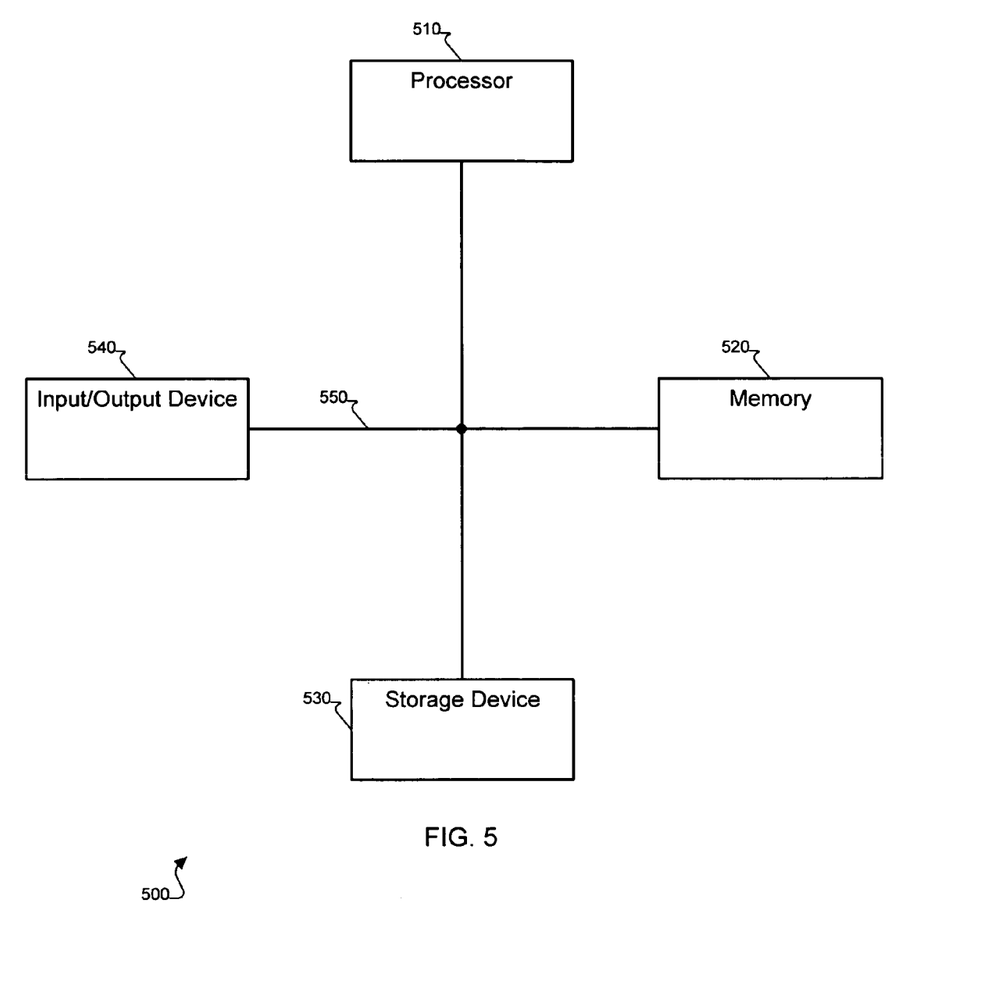
FIG. 5 is a block diagram of a general computer system.

FIG. 5 is a block diagram of a computer system 500 that can be used in the operations described above, according to one embodiment. For example, the system 500 may be included in the system 300.

The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one embodiment, the processor 510 is a single-threaded processor. In another embodiment, the processor 510 is a multi-threaded processor. The processor 510 is capable of processing instructions stored in the memory 520 or on the storage device 530 to display graphical information for a user interface on the input/output device 540.

The memory 520 stores information within the system 500. In one embodiment, the memory 520 is a computer-readable medium. In one embodiment, the memory 520 is a volatile memory unit. In another embodiment, the memory 520 is a non-volatile memory unit.

The storage device 530 is capable of providing mass storage for the system 500. In one embodiment, the storage device 530 is a computer-readable medium. In various different embodiments, the storage device 530 may be a floppy disk device, a hard disk device, an optical disk device, or a tape device.

The input/output device 540 provides input/output operations for the system 500. In one embodiment, the input/output device 540 includes a keyboard and/or pointing device. In one embodiment, the input/output device 540 includes a display unit for displaying graphical user interfaces.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A computer program product tangibly embodied in a storage medium, the computer program product including instructions that, when executed, cause a processor to perform operations included in creation of an electronic document having a plurality of predefined fields, the operations comprising:

receiving an input that a user makes under guidance of an input area in a graphical user interface (GUI) to create an electronic document in a computer system, the input comprising at least a first character string;

determining, among several predefined fields, a first predefined field with which the first character string is associated;

determining, among several templates, a first predefined template in the computer system that includes a template input area for the first predefined field;

determining, among several applications, a first application with which the first predefined template is associated;

launching the first application and displaying the first predefined template in a GUI of the first application with an entry corresponding to the first character string being entered in the template input area for the first predefined field.

2. The computer program product of claim 1, further comprising receiving at least one other input made under guidance of the first predefined template.

3. The computer program product of claim 1, wherein the input area is associated with several predefined templates for initiating creation of electronic documents using any of the predefined templates.

4. The computer program product of claim 3, wherein the input further comprises a second character string that is used to identify the first predefined template among the several predefined templates.

5. The computer program product of claim 1, wherein the input area is associated with the first predefined template for initiating creation of electronic documents using only the first predefined template.

6. The computer program product of claim 1, wherein the entry is selected from the group consisting of:
a name, an address, a location, a time, a date, an amount, a topic, and combinations thereof.

7. The computer program product of claim 6, wherein the first character string is a truncated version of the entry or a code for the entry, and wherein the computer system determines the entry using the first character string.

8. The computer program product of claim 1, wherein the electronic document is selected from the group consisting of a business transaction document, a sales order, a service order, a quote, an invoice, a request, an inquiry, a memorandum, a note documenting a phone conversation, a calendar entry, a meeting request, a email, and combinations thereof.

9. The computer program product of claim 1, wherein the first predefined template is accessed at a predefined site of a public computer network.

10. A computer program product tangibly embodied in a storage medium, the computer program product including instructions that, when executed, cause a processor to perform operations included in creation of an electronic document having a plurality of predefined fields, the operations comprising:
receiving a textual information input that a user makes under guidance of an input area in a graphical user interface (GUI) of a display device and as part of a process of creating an electronic document having predefined fields, the input area in the GUI not being associated with only one of the predefined fields; and
determining whether the textual information input includes value information for any of the predefined fields, and if so 1) identifying the value information in association with the predefined field for the value information; and 2) displaying in the GUI a predefined document creation template that has a template input area for each of the predefined fields, and including the identified value information within the template input area for the predefined field associated with the identified value information;
wherein the first character string is a truncated version of the entry or a code for the entry, and wherein the computer system determines the entry using the first character string.

11. The computer program product of claim 10, wherein the operations further comprise:
receiving at least one other input made under guidance of the predefined document creation template.

12. The computer program product of claim 10, wherein the input area is associated with several predefined document creation templates for initiating creation of electronic documents using any of the predefined document creation templates.

13. The computer program product of claim 12, wherein the textual information input further comprises a character string that is used to identify the predefined document creation template among the several predefined document creation templates.

14. The computer program product of claim 12, wherein some of the several predefined document creation templates are associated with different application programs.

15. The computer program product of claim 10, wherein the input area is associated with the predefined document creation template for initiating creation of electronic documents using only the predefined document creation template.

16. A computer program product tangibly embodied in a storage medium, the computer program product including instructions that, when executed, generate on a display device a graphical user interface for creating an electronic document having a plurality of predefined fields, the graphical user interface comprising:
an input area for guiding a user in making an input to create an electronic document using one of a plurality of predefined templates that is not currently displayed, the input comprising at least a first character string, at least a portion of the predefined templates corresponding to different applications; and
a template display area for displaying at least the predefined template, the predefined template having a template input area for each of several predefined fields;
wherein the GUI is configured to display the predefined template in the template display area upon a determination that the first character string is associated with a first predefined field of the several predefined fields, the first character string being entered in the template input area for the first predefined field.

17. The computer program product of claim 16, wherein the input area is associated with several predefined templates for initiating creation of electronic documents using any of the predefined templates.

18. The computer program product of claim 16, wherein the input area is associated with the predefined template for initiating creation of electronic documents using only the predefined template.

19. The computer program product of claim 1, wherein the operations further comprise:
receiving second input that a user makes under guidance of the input area in the graphical user interface (GUI) to create a second electronic document in the computer system, the second input comprising at least a second character string;
determining, among several predefined fields, a second predefined field with which the second character string is associated;
determining, among several templates, a second predefined template in the computer system that includes a template input area for the second predefined field;
determining, among several applications, a second application with which the second predefined template is associated, the second application being different than the first application;
launching the second application; and
displaying the second predefined template in a GUI of the second application with an entry corresponding to the second character string being entered in the template input area for the second predefined field.

20. The computer program product of claim 1, wherein the input that the user makes under guidance of an input area in the GUI is made using a third application differing from both the first and second applications.

* * * * *